(12) United States Patent
Kumakawa et al.

(10) Patent No.: US 8,511,033 B2
(45) Date of Patent: Aug. 20, 2013

(54) BEAM-COLUMN CONNECTION STRUCTURE OF CONTINUED BEAM CONNECTION PORTION

(75) Inventors: Yoshinobu Kumakawa, Tokyo (JP); Junichi Imai, Tokyo (JP); Kunio Kanai, Tokyo (JP); Masayoshi Nakamura, Tokyo (JP)

(73) Assignees: Sumitomo Forestry Co., Ltd., Tokyo (JP); Kanai Co., Ltd., Tokyo (JP)

( * ) Notice: Subject to any disclaimer, the term of this patent is extended or adjusted under 35 U.S.C. 154(b) by 0 days.

(21) Appl. No.: 13/476,049

(22) Filed: May 21, 2012

(65) Prior Publication Data

US 2013/0125497 A1    May 23, 2013

(30) Foreign Application Priority Data

Jun. 30, 2011    (JP) ................................. 2011-145623

(51) Int. Cl.
*E04C 2/38*    (2006.01)
*E04B 1/38*    (2006.01)

(52) U.S. Cl.
USPC .......... 52/656.9; 52/655.1; 52/653.1; 52/263; 52/665; 403/230; 403/233; 403/408.1; 403/260

(58) Field of Classification Search
USPC ............. 52/653.1, 665, 263, 656.2, 702, 704, 52/656.1, 656.9, 655.1; 403/300, 301, 303, 403/305, 306, 307, 230, 233, 234, 258, 260, 403/408.1
See application file for complete search history.

(56) References Cited

U.S. PATENT DOCUMENTS

| | | | | |
|---|---|---|---|---|
| 4,558,968 A | * | 12/1985 | Meickl | 403/174 |
| 5,342,138 A | * | 8/1994 | Saito et al. | 403/189 |
| 5,438,811 A | * | 8/1995 | Goya | 52/702 |
| 5,577,856 A | * | 11/1996 | Tezuka | 403/294 |
| 5,806,721 A | * | 9/1998 | Tada | 222/153.13 |
| 5,921,049 A | * | 7/1999 | Sugiyama | 52/653.1 |
| 6,032,431 A | * | 3/2000 | Sugiyama | 52/656.9 |
| 7,637,076 B2 | * | 12/2009 | Vaughn | 52/838 |

FOREIGN PATENT DOCUMENTS

| | | | |
|---|---|---|---|
| JP | 11310961 A | * | 11/1999 |
| JP | 2006118254 A | * | 5/2006 |
| JP | 2006-233495 | | 9/2006 |
| JP | 2006348658 A | * | 12/2006 |
| JP | 2009-068293 | | 4/2009 |
| JP | 2009121083 A | * | 6/2009 |

* cited by examiner

*Primary Examiner* — Jeanette E. Chapman
(74) *Attorney, Agent, or Firm* — Young & Thompson (57) ABSTRACT

A beam-column connection structure is formed, after installing a continued beam member to a predetermined position, by connecting and fixing lateral beam members, to side faces of an end portion of the continued beam member using a drift pin while connection grooves are fitted to side face connection metal fittings which are attached to the end portion, connecting an extension beam member to the end portion of the continued beam member using a drift pin while a connection groove formed at an end face of the extension beam member is fitted to the end face connection metal fitting, and connecting and fixing column members, to the upper face and lower face of the end portion of the continued beam member using a drift pin while fitting holes, formed at end faces of the column members, are fitted to the top end side portions of column connection pole-like fittings.

8 Claims, 6 Drawing Sheets

BEAM-COLUMN CONNECTION STRUCTURE OF CONTINUED BEAM CONNECTION PORTION

TECHNICAL FIELD

The present invention relates to a beam-column connection structure of a continued beam connection portion, and in particular, relates to a beam-column connection structure of a continued beam connection portion to which a column member is connected as standing perpendicularly from an upper face and/or a lower face of an end portion of a continued beam member and to which another beam member is connected as extending from the end portion of the continued beam member.

BACKGROUND ART

In a wooden building such as a wooden house, a connection portion of a column member and a beam member structuring a framework structure of a building is generally a continued column connection portion to which the column member is continued as a single wood without being divided and to which the beam member is connected to the side face thereof via a connection metal fitting and the like. However, in recent years, there are cases in which a continued beam connection portion is adopted while the column member is divided into upper and lower parts sandwiching the beam member and the column member stands from an upper face and/or a lower face of the end portion of the beam member for a connection portion of the column member and the beam member, for example, to form a cantilever overhang balcony or an overhang portion (see Patent Literature 1 and Patent Literature 2, for example).

In such beam-column connection structures of the continued beam connection portion, the column member is connected to the continued beam member such that a pole-like connection metal fitting is protruded from an end face of the column member fastened and fixed to the upper face of the beam member as penetrating the continued beam member (see Patent Literature 1) or a pole-like connection metal fitting is fixed as being inserted and arranged at the inside of the continued beam member (see Patent Literature 2). Further, a plate shaped connection metal fitting having an approximate U-shaped section, for example, is attached to the side face and the end face of the continued beam member by using bolt members and another beam member is connected to the continued beam member as being fixed by using drift pins as fitting a connection groove formed at an end face of the other beam member to the overhung plate portion of the connection metal fitting.

CITATION LIST

Patent Literature

Patent Literature 1: JP2006-233495A
Patent Literature 2: JP2009-68293A

SUMMARY OF INVENTION

Technical Problem

However, since the connection of the column member and the continued beam member of the beam-column connection structure of the continued beam connection portion according to Patent Literature 1 and Patent Literature 2 requires to mutually connect and fix metal fitting at the column side which are previously attached to the column member and the metal fitting at the beam side which are previously attached to the continued beam member at a construction site, much time and effort is required for operation of connecting the column member and the beam member while adjusting for an error at the construction site when manufacturing error or attaching error occurs at the connection metal fitting.

In particular, at the continued beam connection portion having connection with the column member standing perpendicularly from the upper face and/or lower face of the end portion of the continued beam member, connection with a lateral beam member extending perpendicularly from at least one of the side faces of the end portion of the continued beam member, and connection with an extension beam member extending linearly from an end face of the end portion of the beam member, much more time and effort for operation of connecting the column member and beam members are required because many connection metal fittings to connect the members are needed to be used and the metal fittings are to be tangled.

Therefore, development of a new beam-column connection structure has been desired which enables to previously attach most connection metal fittings, easily and accurately at a factory and the like, to an end portion of a continued beam member to which a column member, a lateral beam member, and an extension beam member are to be connected and which enables to form a continued beam connection portion with simple operation at a construction site as driving a drift pin after positioning the column member, the lateral beam member, and the extension beam member, for example, to be connected, without requiring much time and effort.

The present invention provides a beam-column connection structure of a continued beam connection portion which enables to previously attach most connection metal fittings, easily and accurately at a factory and the like, to an end portion of a continued beam member to which a column member, a lateral beam member, and an extension beam member are to be connected and which enables to efficiently form the continued beam connection portion having high quality with simple operation at a construction site as driving a drift pin after positioning the column member, the lateral beam member, and the extension beam member against the installed continued beam member, without requiring much time and effort.

Solution to Problem

According to the present invention, there is provided a beam-column connection structure of a continued beam connection portion in which a column member is connected as standing vertically from an upper face and/or a lower face of an end portion of a continued beam member, a lateral beam member is connected as extending perpendicularly in a lateral direction from at least one of side faces of the end portion of the continued beam member, and an extension beam member is connected as extending linearly from an end face of the end portion of the continued beam member, including: a pipe fitting hole which is formed at the end portion of the continued beam member as vertically penetrating the end portion; a joint pipe which is embedded in the pipe fitting hole as having a bolt insertion hole and a bolt screw hole at a circumferential face; a side face connection metal fitting which is tightened and fixed to the side face of the end portion of the continued beam member by using a long bolt member arranged as penetrating the end portion of the continued beam member in the lateral direction in a state of being inserted to the bolt insertion hole of the joint pipe; an end face connection metal fitting which is tightened and fixed to the end face of the end portion of the continued beam member by using a bolt member of which top external thread portion is screwed to the bolt screw hole of the joint pipe; and a column connection pole-like metal fitting which is fixed as having a top end side portion protruded from the upper face and/or lower face of the end portion of the continued beam member as being inserted and mounted to the joint pipe through an opening end face of the joint pipe, wherein the lateral beam member is connected and fixed to the side face of the end portion of the continued beam member by using a drift pin while a connection groove formed at an end face of the lateral beam member is fitted to the side face connection metal fitting; the extension beam member is connected and fixed to an end face of the end portion of the continued beam member by using a drift pin while a connection groove formed at an end face of the extension beam member is fitted to the end face connection metal fitting; and the column member is connected and fixed to the upper face and/or lower face of the end portion of the continued beam member by using a drift pin while a fitting hole formed at an end face of the column member is fitted to the top end side portion of the column connection pole-like metal fitting.

In the beam-column connection structure of a continued beam connection portion according to the present invention, it is preferable that the column connection pole-like metal fitting includes an overlapping bolt insertion hole at a part being inserted and mounted to the joint pipe as being arranged at a position coincident with the bolt insertion hole and bolt screw hole of the joint pipe; and the column connection pole-like metal fitting is fixed to the joint pipe by using the long bolt member and/or the bolt member which connect and fix the side face connection metal fitting and the end face connection metal fitting to the end portion of the continued beam member.

In the beam-column connection structure of a continued beam connection portion according to the present invention, it is preferable that the joint pipe is embedded in the pipe fitting hole in a state that the opening end face is arranged to be flush to the upper face and/or lower face of the end portion of the continued beam portion.

In the beam-column connection structure of a continued beam connection portion according to the present invention, it is preferable that the side face connection metal fitting and the end face connection metal fitting are plate-like connection metal fittings processed to have an approximately U-shaped section.

In the beam-column connection structure of a continued beam connection portion according to the present invention, it is preferable that the bolt insertion hole and the bolt screw hole are formed at a circumferential face of the joint pipe in a state of being mutually displaced in the axial direction of the joint pipe.

Advantageous Effects of Invention

According to a beam-column connection structure of a continued beam connection portion of the present invention, most connection metal fittings can be previously attached, easily and accurately such as at a factory, to an end portion of a continued beam member to which a column member, a lateral beam member, and an extension beam member are to be connected and the continued beam connection portion having high quality can be efficiently formed with simple operation at a construction site as driving a drift pin after positioning the column member, the lateral beam member, and the extension beam member against the installed continued beam member, without requiring much time and effort.

DESCRIPTION OF EMBODIMENTS

Figure 1:
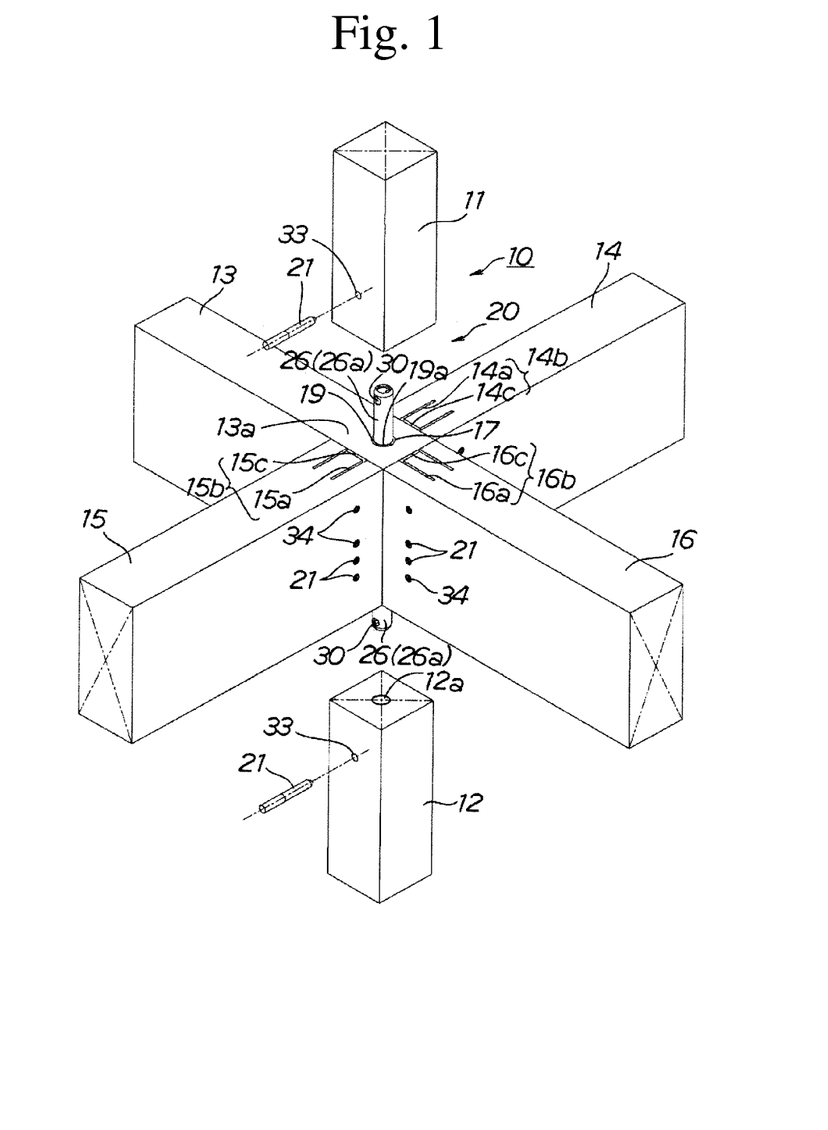
FIG. 1 is an explanatory perspective view illustrating a beam-column connection structure of a continued beam connection portion according to a preferable embodiment of the present invention in a state as column members being exploded.
Figure 2:
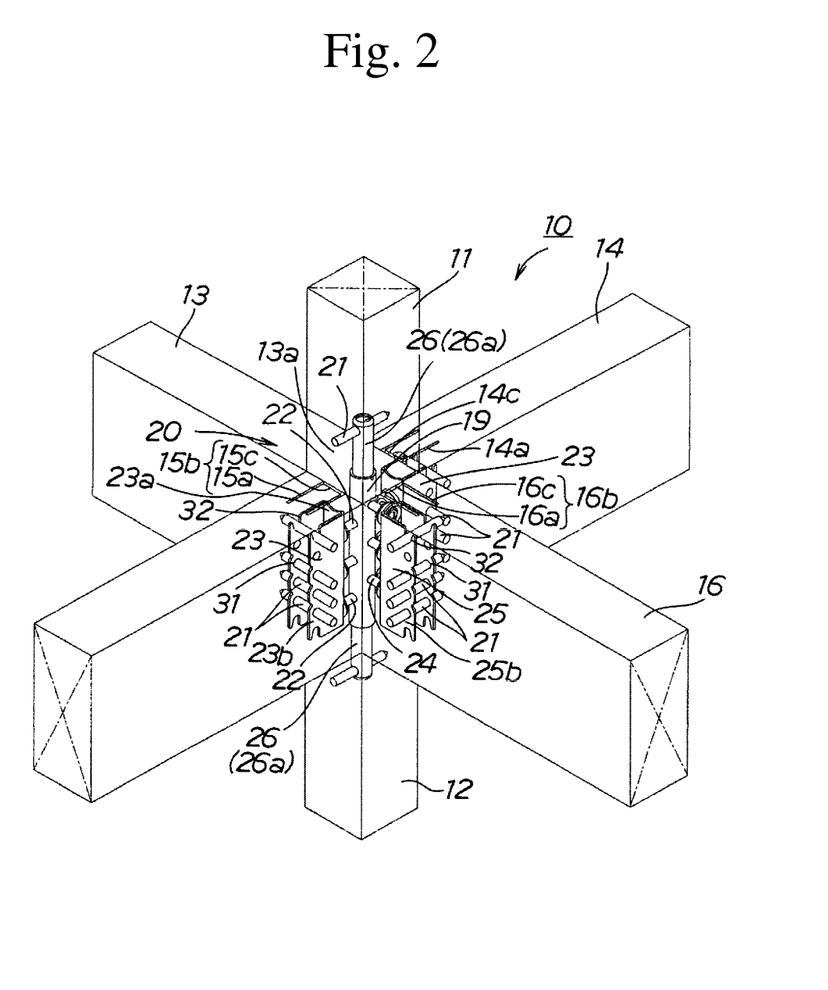
FIG. 2 is an explanatory perspective view illustrating the beam-column connection structure of the continued beam connection portion according to the preferable embodiment of the present invention with each connection metal fitting in a see-through state.

As illustrated in FIGS. 1 and 2, a beam-column connection structure 10 of a continued beam connection portion according to a preferable embodiment of the present invention is a connection structure adopted to form a continued beam connection portion 20 easily and smoothly via plural connection metal fittings 19, 23, 25, 26 previously attached to a continued beam member 13 at a factory and the like without requiring much time and effort at a construction site. The continued beam connection portion 20 is constructed as a connection portion of column members 11, 12 and beam members 13, 14, 15, 16 to arrange a cantilever overhang balcony or an overhang portion, for example, such as at a wooden house as column members 11, 12 stand perpendicularly from an upper face and a lower face of an end portion 13a of the continued beam member 13 while column members 11, 12 are divided into upper and lower parts sandwiching the continued beam member 13, a pair of lateral beam members 14, 15 extend perpendicularly in a lateral direction from both sides of side faces of the end portion 13a of the continued beam member 13 respectively, and an extension beam member 16 extends linearly from an end face of the end portion 13a of the continued beam member 13.

Figure 3:
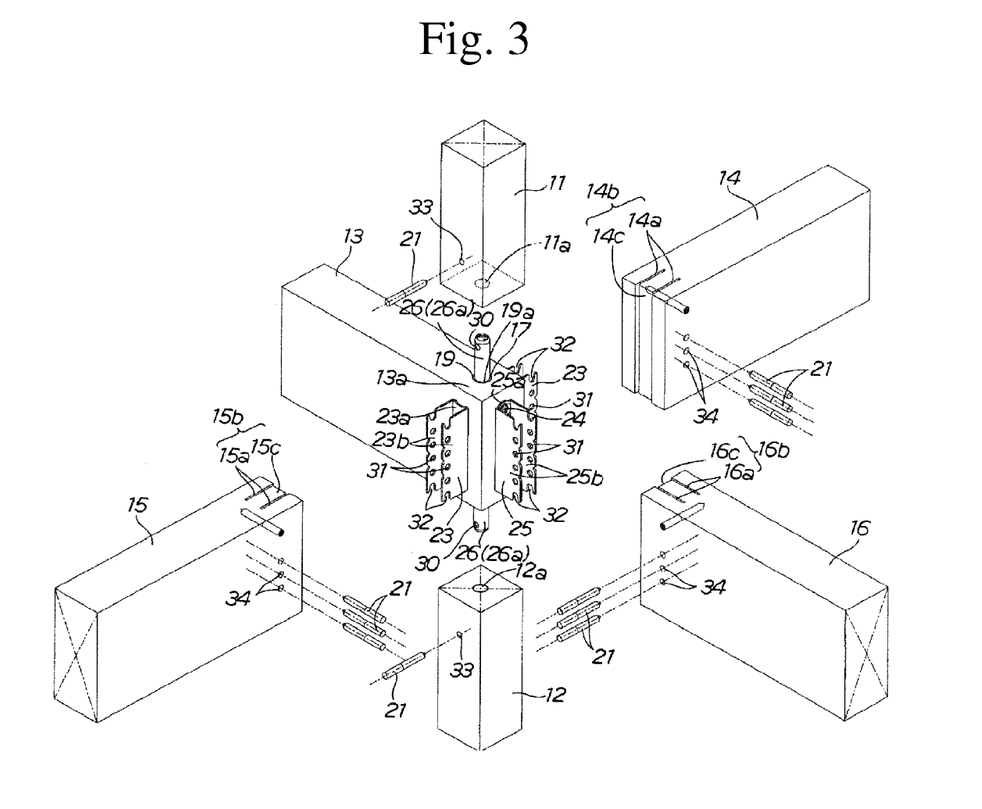
FIG. 3 is an exploded perspective view to explain the beam-column connection structure of the continued beam connection portion according to the preferable embodiment of the present invention.

That is, as illustrated in FIG. 3, the beam-column connection structure 10 of the continued beam connection portion of the present embodiment can efficiently form a continued beam connection portion 20 having high quality with simple operation at a construction site as driving a drift pin 21 after positioning column members 11, 12, the pair of lateral beam members 14, 15, and the extension beam member 16 against the end portion 13a of the installed continued beam member 13 since all connection metal fittings 19, 23, 25, 26 except the drift pin 21 is previously attached to the end portion 13a of the continued beam member 13, easily and accurately at a factory and the like.

As illustrated in FIGS. 1 to 3, the beam-column connection structure 10 of the continued beam connection portion of the present embodiment is a connection structure of the continued beam connection portion 20 which the column members 11, 12 are connected as standing vertically from the upper face and/or lower face (in the present embodiment, the upper face and lower face) of the end portion 13a of the continued beam member 13, the lateral beam members 14, 15 are connected as extending perpendicularly in the lateral direction from at least one of the side faces (in the present embodiment, both side faces) of the end portion 13a of the continued beam member 13, and the extension beam member 16 is connected as extending linearly from the end face of the end portion 13a of the continued beam member 13. The beam-column connection structure 10 is structured including a pipe fitting hole 17 which is formed at the end portion 13a of the continued beam member 13 as vertically penetrating the end portion 13a, a joint pipe 19 which is embedded in the pipe fitting hole 17 as having bolt insertion holes 18a and bolt screw holes 18b (see FIG. 4) at a circumferential face, side face connection metal fittings 23 which are tightened and fixed to both sides of side faces of the end portion 13a of the continued beam member 13 (see FIG. 3) by using long bolt members 22 as penetrating the end portion 13a of the continued beam member 13 in the lateral direction in a state of being inserted to the bolt insertion holes 18a of the joint pipe 19 (see FIG. 6), the end face connection metal fitting 25 which is tightened and fixed to the end face of the end portion 13a of the continued beam member 13 (see FIG. 3) by using bolt members 24 of which the top end external thread portion 24a is screwed to the bolt screw hole 18b of the joint pipe 19, and the column connection pole-like metal fittings 26 which are fixed as having a top end side portion 26a protruded from the upper face and/or lower face (in the present embodiment, the upper face and lower face) of the end portion 13a of the continued beam member 13 as being inserted and mounted to the joint pipe 19 through an opening end face 19a of the joint pipe 19 (see FIG. 5).

In the present embodiment, the joint pipe 19, the pair of side face connection metal fittings 23, the end face connection metal fitting 25, and the pair of column connection pole-like metal fittings 26 are accurately attached to the end portion 13a of the continued beam member 13 previously at a factory and the like before being carried into a construction site by using long bolt members 22 and bolt members 24.

In the present embodiment, with operation at a construction site after installing the carried-in continued beam member 13 to a predetermined position, the lateral beam members 14, 15 are connected and fixed to the side faces of the end portion 13a of the continued beam member 13 using the drift pin 21 while connection grooves 14a, 15a formed at end faces of lateral beam members 14, 15 are fitted to the side face connection metal fittings 23 which are attached to the end portion 13a of the continued beam member 13, the extension beam member 16 is connected and fixed to the end face of the end portion 13a of the continued beam member 13 using the drift pin 21 while a connection groove 16a formed at an end face of the extension beam member 16 is fitted to the end face connection metal fitting 25, and upper and lower column members 11, 12 are connected and fixed to the upper face and lower face of the end portion 13a of the continued beam member 13 using the drift pin 21 while fitting holes 11a, 12a (see FIG. 3) formed at end faces of column members 11, 12 are fitted to the top end side portions 26a of column connection pole-like metal fittings 26. In this manner, the beam-column connection structure 10 is formed.

Figure 4:
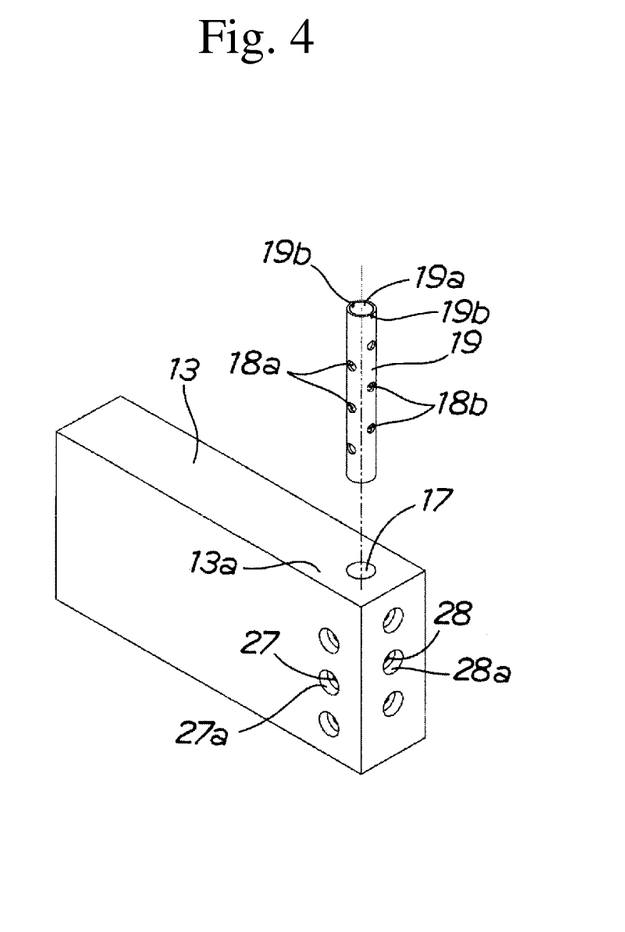
FIG. 4 is an exploded perspective view to explain a structure to attach a joint pipe to an end portion of a continued beam member.

In the present embodiment, the continued beam member 13 structuring the beam-column connection structure 10 is a wooden square log having a longitudinally rectangular section with dimension of approximately 105 mm in width and approximately 240 mm in height, for example, as also illustrated in FIG. 4. The pipe fitting hole 17 having a circular section with an inner diameter of approximate 34 mm, for example, for embedding the joint pipe 19 is formed at the end portion 13a of the continued beam member 13 penetrating the upper face and lower face thereof.

Bolt through holes 27 for inserting long bolt members 22 are formed as being opened at both sides of side faces of the end portion 13a of the continued beam member 13 boring toward the pipe fitting hole 17 from the side faces at three positions for each side face at predetermined intervals in the vertical direction (see FIG. 4). The bolt through holes 27 have a two-step structure as diameter of parts of the side face side of the continued beam member 13 is enlarged. The side face metal fittings 23 can be rigidly fastened and fixed to the side faces of the continued beam member 13 using the long bolt members 22 and nuts 22a while positioning side face connection metal fittings 23 to the side faces of the continued beam member 13 in a stable state by mounting later mentioned positioning protruded portions 23c (see FIG. 6) which is protruded to the outside from abutment plate portions 23a of the side face connection metal fittings 23 to enlarged diameter parts 27a of the side face side of the continued beam member 13. Here, the bolt through holes 27 can be arranged at one, two, four, or more positions respectively at both sides of side faces of the end portions 13a of the continued beam member 13.

Bolt through holes 28 to insert bolt members 24 are formed at the end face of the end portion 13a of the continued beam member 13 boring toward the pipe fitting hole 17 from the end face as being opened at three positions at predetermined intervals in the vertical direction. The bolt through holes 28 have a two-step structure as diameter of parts of the end face side of the continued beam member 13 is enlarged as being similar to the bolt through holes 27 of the side faces of the continued beam member 13. The end face connection metal fitting 25 can be rigidly fastened and fixed to the end face of the continued beam member 13 using the bolt members 24 while positioning the end face connection metal fitting 25 to the end face of the continued beam member 13 in a stable state by mounting later-mentioned positioning protruded portions 25c which is protruded to the outside from abutment plate portions 25a of the end face connection metal fitting 25 to enlarged diameter parts 28a of the end face side. Here, the bolt through holes 28 can be arranged at one, two, four, or more positions at the end face of the end portions 13a of the continued beam member 13.

Here, the bolt through holes 27 which are opened at the side faces of the end portion 13a of the continued beam member 13 and the bolt through holes 28 which are opened at the end face are respectively formed being opened at positions displaced in the height direction corresponding to the later-mentioned bolt insertion holes 18a and bolt screw holes 18b which are arranged at the joint pipe 19.

Figure 5:
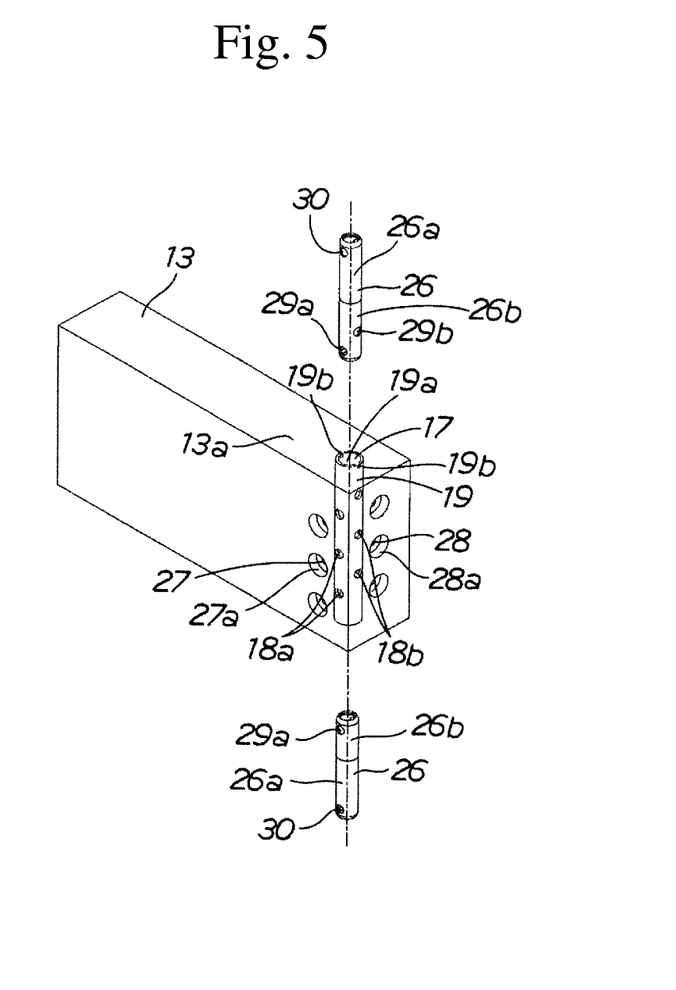
FIG. 5 is an exploded perspective view to explain a structure to attach column connection pole-like metal fittings to the end portion of the continued beam member via the joint pipe with the joint pipe in a see-through state.

The joint pipe 19 which is embedded in the pipe fitting hole 17 of the end portion 13a of the continued beam member 13 is a hollow cylinder shaped pipe member which is made of metal, for example, having both ends being opened as opening end faces 19a, as illustrated in FIGS. 4 and 5. The joint pipe 19 has a length same to the height of the continued beam member 13 and an outer diameter same to the inner diameter of the pipe fitting hole 17. Therefore, the joint pipe 19 is embedded in the pipe fitting hole 17 in a state as being exactly fitted to the pipe fitting hole 17 and having the upper and lower opening end faces 19a arranged at the same surface to be flush to the upper face and lower face of the end portion 13a of the continued beam member 13 respectively.

Since the joint pipe 19 is embedded in the pipe fitting hole 17 in a state as having the upper and lower opening end faces 19a arranged at the same surface to be flush to the upper face and lower face of the end portion 13a of the continued beam member 13 respectively, the bolt insertion holes 18a and the bolt screw holes 18b of the joint pipe 19 can be easily adjusted to the position of the bolt through holes 28, 27 of the end portion 13a of the continued beam member 13 and the joint pipe 19 can effectively resist against horizontal force acting on the upper and lower column members 11, 12. Biting claws 19b are arranged at plural positions of the opening end face 19a at the upper part of the joint pipe 19 protruding to the outside from the outer circumferential portion. With the biting claws 19b biting an opening edge portion of the pipe fitting hole 17, the joint pipe 19 can be easily embedded in the pipe fitting hole 17 and be fixed in a state as having the upper and lower opening end faces arranged at the same surface to be flush to the upper face and lower face of the end portion 13a of the continued beam member 13. Here, not both of the upper and lower opening end faces 19a of the joint pipe 19 have to be arranged at the same surface to be flush to the end portion 13a of the continued beam member 13, as the lower opening end face 19a may be arranged at a different face from the lower face of the end portion 13a of the continued beam member 13, for example.

At the circumferential face of the joint pipe 19, a pair of bolt insertion holes 18a formed being opened at positions opposing in a radial direction of the joint pipe 19 is formed at three positions respectively at predetermined intervals in an axial direction of the joint pipe 19, representing a total of six positions. Further, at the circumferential face of the joint pipe 19, the bolt screw holes 18b are formed being opened at three positions at predetermined intervals in the axial direction of the joint pipe 19 at a position 90 degrees apart in the circumferential direction from the radial direction which each pair of bolt insertion holes 18a are opposed. Here, as similar to the bolt through holes 27, 28 arranged at the end portion 13a of the continued beam member 13, the bolt insertion holes 18a and the bolt screw holes 18b can be arranged at one, two, four, or more positions in the vertical direction.

In the present embodiment, the bolt insertion holes 18a and the bolt screw holes 18b are formed at the circumferential face of the joint pipe 19 in a state as the positions in the axial direction of the joint pipe 19 are displaced respectively. Since the bolt insertion holes 18a and the bolt screw holes 18b are formed as the positions in the axial direction of the joint pipe 19 are displaced respectively, the long bolt members 22 which is inserted to the bolt insertion holes 18a and the bolt members 24 which are screwed to the bolt screw holes 18b can be fastened to the end portion 13a of the continued beam member 13 without interfering each other.

The joint pipe 19 is embedded in the pipe fitting hole 17 in a state as each pair of bolt insertion holes 18a are aligned to the bolt through holes 27a which are formed being opened at three positions each at both sides of side faces of the end portion 13a of the continued beam member 13 and three positions of bolt screw holes 18b are respectively aligned to three positions of the bolt through holes 28a which are formed being opened at the end face of the end portion 13a of the continued beam member 13. The pair of upper and lower column connection pole-like metal fittings 26 are respectively inserted and mounted to the embedded joint pipe 19 through the upper and lower opening end faces 19a.

The column connection pole-like metal fittings 26 are cylinder shaped sleeve members made of metal having an outer diameter same to the inner diameter of the joint pipe 19 and having shorter length than that of the joint pipe 19, for example. The column connection pole-like metal fitting 26 is formed with an insert side part 26b which is inserted and arranged at the inside of the joint pipe 19 and a top end side portion 26a which is arranged at the opposite side to the insert side part 26b. The column connection pole-like metal fittings 26 are fixed to the end portion 13a of the continued beam member 13 via the joint pipe 19 in a state as the top end side portions 26a stand at a predetermined height protruded from the upper face or lower face of the end portion 13a of the continued beam member 13. Since the column connection pole-like metal fittings 26 are fixed via the joint pipe 19 as standing from the end portion 13a of the continued beam member 13 at a predetermined height, column connection pole-like metal fittings 26 with same dimension can be used regardless of a section face of the continued beam member 13 (i.e., beam depth). Here, the length of the column connection pole-like metal fittings 26 may be longer than the joint pipe 19 and end portions at both sides may be respectively protruded from the upper face and lower face of the end portion 13a of the continued beam member 13.

In the present embodiment, the insert side part 26b which is a part of the column connection pole-like metal fitting 26 includes the overlapping bolt insertion holes 29a, 29b at a part being inserted and mounted to the joint pipe 19 as being arranged at a position coincident with the bolt insertion holes 18a and the bolt screw holes 18b of the joint pipe 19. The column connection pole-like metal fittings 26 are attached to the joint pipe 19 by inserting the long bolt members 22 and the bolt members 24 to the overlapping bolt insertion holes 29a, 29b at the same time that the side face connection metal fittings 23 and the end face connection metal fitting 25 are fixed to the side faces and the end face of the end portion 13a of the continued beam member 13 by using the long bolt members 22 and the bolt members 24 to connect and fix the side face connection metal fittings 23 and the end face connection metal fitting 25 to the end portion 13a of the continued beam member 13.

In the present embodiment, a pair of first overlapping bolt insertion holes 29a opposing in the radial direction and one position of a second overlapping bolt insertion hole 29b are formed being opened at the circumferential face of the insert side part 26b of the column connection pole-like metal fitting 26 which is attached to the upper face side of the end portion 13a of the continued beam member 13 corresponding to the position of the bolt insertion holes 18a and the bolt screw holes 18b which are formed at the circumferential face of the joint pipe 19. On the other hand, the pair of first overlapping bolt insertion holes 29a opposing in the radial direction is formed being opened at the circumferential face of the insert side part 26b of the column connection pole-like metal fitting 26 which is attached to the lower face side of the end portion 13a of the continued beam member 13 (see FIG. 5). Here, the first overlapping bolt insertion holes 29a and the second overlapping bolt insertion holes 29b can be arranged at the column connection pole-like metal fittings 26 for more than one pair or more than one position respectively.

Further, in the present embodiment, drift pin engaging holes 30 are formed at the top end side portions 26a which are parts of the column connection pole-like metal fittings 26 standing from the upper face and lower face of the end portion 13a of the continued beam member 13 to penetrate and engage the drift pins 21 used at the time that the upper and lower column members 11, 12 are respectively connected to the end portion 13a of the continued beam member 13 via the top end side portions 26a.

Figure 6:
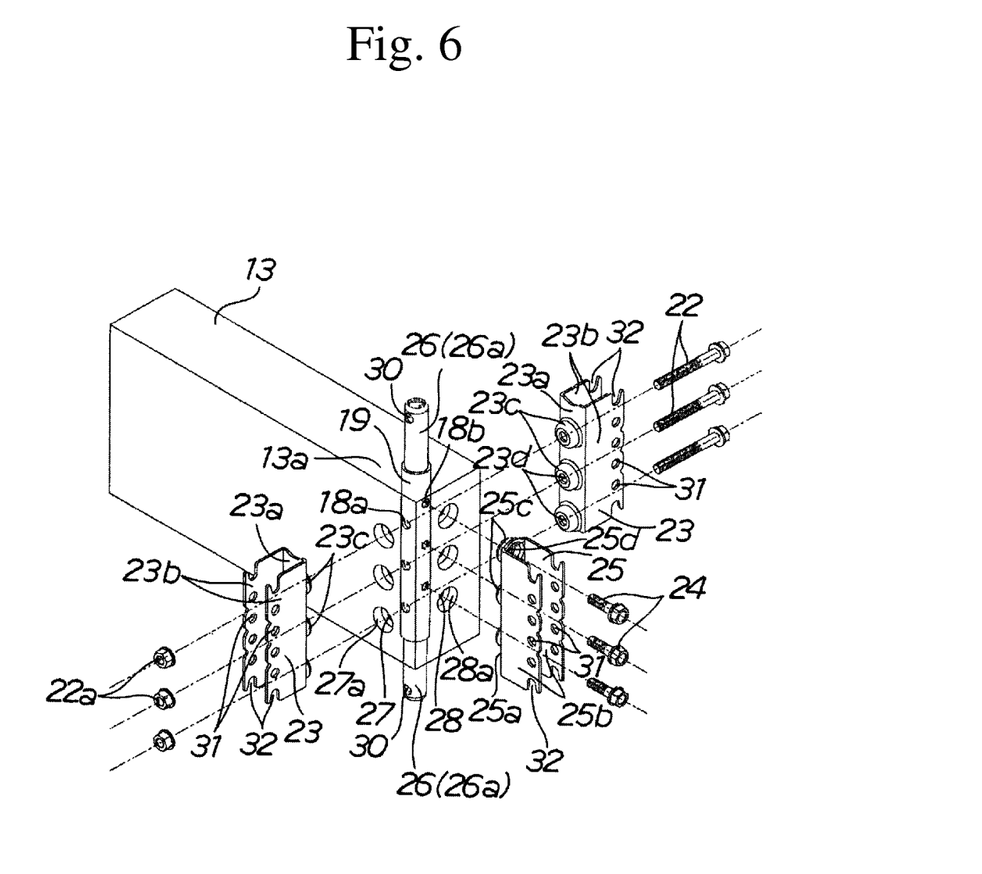
FIG. 6 is an exploded perspective view to explain a structure to attach side face connection metal fittings and end face connection metal fittings to the end portion of the continued beam member with the joint pipe in a see-through state.

As illustrated in FIGS. 2, 3, and 6, the side face connection metal fittings 23 respectively connected and fixed to both sides of the side faces of the end portion 13a of the continued beam member 13 are plate shaped connection metal fittings processed to have an approximately U-shaped section by performing folding process and the like to a metal made plate member. The side face connection metal fittings 23 are formed with abutment plate portions 23a which are the intermediate side portions of the approximately U-shaped section and brattish plate portions 23b which are a pair of side arm portions of the approximately U-shaped section. As described above, positioning protruded portions 23c which are mounted to the enlarged diameter parts 27a of the bolt through holes 27 formed at both sides of side faces of the end portion 13a of the continued beam member 13 to perform positioning are formed at three positions of the abutment plate portion 23a at predetermined intervals in the vertical direction. Bolt fastening holes 23d (see FIG. 6) are formed being opened at center parts of the positioning protruded portions 23c and head portions of the long bolt member 22 and the nuts 22a to fix the side face connection metal fittings 23 to the side faces of the continued beam member 13 are fastened at midair of the inside of the positioning protruded portions 23c with intermediate of washer members as needed. Here, as similar to the bolt through holes 27 arranged at both sides of side faces of the end portion 13a of the continued beam member 13, the positioning protruded portions 23c where the bolt fastening holes 23d are formed being opened can be arranged at one, two, four, or more positions respectively.

Further, drift pin engaging holes 31 and drift pin engaging cutout 32 are formed at plural positions at the brattish plate portions 23b which are parts of the side face connection metal fittings 23 being the pair of side arm portions of the approximately U-shaped section to engage the drift pins 21 used at the time that the lateral beam members 14, 15 at both sides are respectively connected to the side faces of the continued beam member 13 via the side face connection metal fittings 23.

The end face connection metal fitting 25 connected and fixed to the end faces of the end portion 13a of the continued beam member 13 are plate shaped connection metal fittings processed to have an approximately U-shaped section by performing folding process and the like to a metal made plate member, as similar to the side face connection metal fittings 23. The end face connection metal fitting 25 is formed with abutment plate portions 25a which are the intermediate side portions of the approximately U-shaped section and brattish plate portions 25b which are a pair of side arm portions of the approximately U-shaped section. As described above, positioning protruded portions 25c which are mounted to the enlarged diameter parts 28a of the bolt through holes 28 formed at both sides of side faces of the end portion 13a of the continued beam member 13 to perform positioning are formed at three positions of the abutment plate portion 25a at predetermined intervals in the vertical direction. Bolt fastening holes 25d (see FIG. 6) are formed being opened at center parts of the positioning protruded portions 25c and head portions of the bolt members 24 to fix the end face connection metal fitting 25 to the end faces of the continued beam member 13 are fastened at midair of the inside of the positioning protruded portions 25c with intermediate of washer members as needed. Here, as similar to the bolt through holes 28 arranged at the end face of the end portion 13a of the continued beam member 13, the positioning protruded portions 25c where the bolt fastening holes 25d are formed being opened can be arranged at one, two, four, or more positions.

Further, drift pin engaging holes 31 and drift pin engaging cutout 32 are formed at plural positions at the brattish plate portions 25b which are parts of the end face connection metal fitting 25 being the pair of side arm portions of the approximately U-shaped section to engage the drift pins 21 used at the time that the extension beam member 16 is connected to the end face of the continued beam member 13 via the end face connection metal fitting 25.

In the present embodiment, the column members 11, 12 structuring the beam-column connection structure 10 are a wooden square log having a quadrate section with dimensions of approximate 105 mm in height and width, for example, as illustrated in FIGS. 1 to 3. The fitting hole 11a which is an opening at the center part of the lower end face of the upper column member 11 and which is formed as a boring in the axial direction is arranged at the upper column member 11 which is attached to the upper face of the end portion 13a of the continued beam member 13 standing perpendicularly upward therefrom. The fitting hole 11a has an inner diameter same to the outer diameter of the top end side portions 26a of the column connection pole-like metal fitting 26 which is protruded from the upper face of the end portion 13a of the continued beam member 13. Therefore, the top end side portions 26a of the column connection pole-like metal fitting 26 is mounted to the fitting hole 11a as being exactly fitted. A column side drift pin engaging hole 33 is formed as a boring at the lower end portion of the upper column member 11 which penetrates a pair of opposing side faces at a position coincident with the position of the drift pin engaging hole 30 formed at the top end side portion 26a of the column connection pole-like metal fitting 26 at the time that the fitting hole 11a is mounted.

The fitting hole 12a which is an opening at the center part of the upper end face of the lower column member 12 and which is formed as a boring in the axial direction is arranged at the lower column member 12 which is attached to the lower face of the end portion 13a of the continued beam member 13 standing perpendicularly downward therefrom. The fitting hole 12a has an inner diameter same to the outer diameter of the top end side portions 26a of the column connection pole-like metal fitting 26 which is protruded from the lower face of the end portion 13a of the continued beam member 13. Therefore, the top end side portion 26a of the column connection pole-like metal fitting 26 is mounted to the fitting hole 12a as being exactly fitted. A column side drift pin engaging hole 33 is formed as a boring at the lower end portion of the lower column member 12 which penetrates a pair of opposing side faces at a position coincident with the position of the drift pin engaging hole 30 formed at the top end side portion 26a of the column connection pole-like metal fitting 26 at the time that the fitting hole 12a is mounted.

In the present embodiment, the pair of right and left lateral beam members 14, 15 structuring the beam-column connection structure 10 is a wooden square log respectively having a longitudinally rectangular section with dimensions of approximate 105 mm in width and approximate 240 mm in height, for example, as similar to the continued beam member 13. Cutout concave portions 14b, 15b which are approximately U-shaped sections including pairs of a parallel connection grooves 14a, 15a cutout in the direction perpendicular to the end faces of the lateral beam member 14, 15 are respectively formed at the end faces of the lateral beam member 14, 15 connected to the side faces of the end portion 13a of the continued beam member 13. That is, the cutout concave portion 14b, 15b are formed with end face cutout portions 14c, 15c being the intermediate arm portions of the approximately U-shaped section which is thinly cutout along the end face of the lateral beam members 14, 15 and connection grooves 14a, 15a being a pair of side arm portions of the approximately U-shaped section which is cutout perpendicularly from the both end portions of the end face cutout portions 14c, 15c in the axial direction of the lateral beam members 14, 15.

The pair of brattish plate portions 23b of the side face connection metal fittings 23 fixed to the side faces of the continued beam member 13 are respectively mounted to be exactly fitted to the pair of connection grooves 14a, 15a of the cutout concave portion 14b, 15b formed at the end faces of the lateral beam members 14, 15 at the time that the lateral beam members 14, 15 are respectively connected and fixed to the both sides of side faces of the end portion 13a of the continued beam member 13 via the side face connection metal fittings 23. The abutment plate portions 23a of the side face connection metal fittings 23 are attached in a state as being fitted to the end face cutout portion 14c, 15c of the cutout concave portion 14b, 15b.

Further, beam side drift pin engaging holes 34 are formed as borings at parts of the side faces of the lateral beam members 14, 15 adjacent to the end faces which the cutout concave portions 14b, 15b are formed penetrating between both sides of side faces at a position coincident with some of the drift pin engaging holes 31 and drift pin engaging cutout 32 selected within the drift pin engaging holes 31 and drift pin engaging cutout 32 formed in a plural manner at the brattish plate portions 23b of the side face connection metal fittings 23 mounted to the connection grooves 14a, 15a.

In the present embodiment, the extension beam member 16 structuring the beam-column connection structure 10 is a wooden square log respectively having a longitudinally rectangular section with dimensions of approximate 105 mm in width and approximate 240 mm in height, for example, as similar to the continued beam member 13. The cutout concave portion 16b which is an approximately U-shaped section including pairs of a parallel connection grooves 16a cutout in the direction perpendicular to the end face of the extension beam member 16 are formed at the end face of the extension beam member 16 connected to the end face of the continued beam member 13. That is, the cutout concave portion 16b is formed with the end face cutout portion 16c being the intermediate arm portions of the approximately U-shaped section which is thinly cutout along the end face of the extension beam member 16 and connection grooves 16a being a pair of side arm portions of the approximately U-shaped section which is cutout perpendicularly from the both end portions of the end face cutout portion 16c in the axial direction of the extension beam member 16.

The pair of brattish plate portions 25b of the end face connection metal fitting 25 fixed to the end face of the continued beam member 13 is mounted to be exactly fitted to the pair of connection grooves 16a of the cutout concave portion 16b formed at the end faces of the extension beam member 16 at the time that the extension beam member 16 is connected and fixed to the end face of the continued beam member 13 via the end face connection metal fitting 25. The abutment plate portions 25a of the end face connection metal fitting 25 are attached in a state as being fitted to the end face cutout portion 16c of the cutout concave portion 16b.

Further, beam side drift pin engaging holes 34 are formed as borings at parts of the side faces of the extension beam member 16 adjacent to the end faces which the cutout concave portions 16b are formed penetrating between both sides of side faces at a position coincident with some of the drift pin engaging holes 31 and drift pin engaging cutout 32 selected within the drift pin engaging holes 31 and drift pin engaging cutout 32 formed in a plural manner at the brattish plate portion 25b of the end face connection metal fitting 25 mounted to the connection grooves 16a.

According to the beam-column connection structure 10 of the continued beam connection portion of the present embodiment having the above structure, the side face connection metal fittings 23, the end face connection metal fitting 25, and the column connection pole-like metal fittings 26 as connection metal fittings except of the drift pin 21 can be previously attached integrally to the end portion 13a of the continued beam member 13, easily and accurately at a factory and the like by using long bolt members 22 and bolt members 24.

That is, as illustrated in FIGS. 4 to 6, the connection metal fittings 23, 25, and 26 can be accurately fixed to the end portion 13a of the continued beam member 13 rigidly and in a stable state by inserting and fastening the long bolt members 22 and the bolt members 24 to the bolt insertion holes 18a, 29a, bolt screw holes 18b, 29b, and the bolt through holes 27, 28 which are positioned in a state as positioning is performed by inserting the joint pipe 19 to the column connection pole-like metal fittings 26, and the side face connection metal fittings 23 and the end face connection metal fitting 25 are positioned against the end portion 13a of the continued beam member 13 through the enlarged diameter portion 27a, 28a of the bolt through holes 27, 28 and the positioning protruded portion 23c, 25c of the connection metal fittings 23, 25 after the joint pipe 19 is embedded to the pipe fitting hole 17 of the end portion 13a of the continued beam member 13, for example.

On the other hand, at the construction site, after installing the carried-in continued beam member 13 to a predetermined position in a state as the connection metal fittings 23, 25, 26 are previously and accurately attached to the end portion 13a, the pair of right and left lateral beam members 14, 15 are connected and fixed to the end portion 13a of the continued beam member 13 using the drift pin 21 while connection grooves 14a, 15a formed at end faces of lateral beam members 14, 15 are fitted to the side face connection metal fittings 23 which are attached to the end portion 13a, the extension beam member 16 is connected and fixed to the end portion 13a of the continued beam member 13 using the drift pin 21 while a connection groove 16a formed at the end face of the extension beam member 16 is fitted to the end face connection metal fitting 25 which are attached to the end face of the end portion 13a, and the pair of upper and lower column members 11, 12 are connected and fixed to the upper face and lower face of the end portion 13a of the continued beam member 13 using the drift pin 21 while fitting fitting holes 11a, 12a formed at end faces of column members 11, 12 are fitted to the top end side portions 26a of the pair of upper and lower column connection pole-like metal fittings 26, as illustrated in FIGS. 1 to 3. With such simple operation, the continued beam connection portion 20 having high quality can be formed efficiently as the pair of column members 11, 12, the pair of lateral beam members 14, 15, and the extension beam member 16 are integrally connected to the end portion 13a of the continued beam member 13.

Therefore, according to the beam-column connection structure 10 of the continued beam connection portion of the present embodiment, most connection metal fittings 23, 25, 26 can be previously attached to the end portion 13a of the continued beam member 13, easily and accurately at a factory and the like, which column members 11, 12, lateral beam members 14, 15, and the extension beam member 16 are connected. The continued beam connection portion 20 having high quality can be efficiently formed with simple operation at a construction site as driving a drift pin 21 after positioning column members 11, 12, lateral beam members 14, 15, and the extension beam member 16 against the end portion 13a of the installed continued beam member 13 without requiring much time and effort.

Here, not limited to the above embodiment, the present invention may be modified variously. For example, a continued beam connection portion which the present invention targets does not necessarily have to have column members standing from both the upper face and lower face of an end portion of a continued beam member but the column member may stand only from either the upper face or lower face. Further, a lateral beam member does not necessarily have to be connected to both sides of the end portion of the continued beam member but may be connected to only either of the side faces.

The invention claimed is:

1. A beam-column connection structure of a continued beam connection portion in which a column member is connected as standing vertically from an upper face and/or a lower face of an end portion of a continued beam member, a lateral beam member is connected as extending perpendicularly in a lateral direction from at least one of side faces of the end portion of the continued beam member, and an extension beam member is connected as extending linearly from an end face of the end portion of the continued beam member, comprising:

a pipe fitting hole which is formed at the end portion of the continued beam member as vertically penetrating the end portion;

a joint pipe which is embedded in the pipe fitting hole as having a bolt insertion hole and a bolt screw hole at a circumferential face;

a side face connection metal fitting which is tightened and fixed to the side face of the end portion of the continued beam member by using a long bolt member arranged as penetrating the end portion of the continued beam member in the lateral direction in a state of being inserted to the bolt insertion hole of the joint pipe;

an end face connection metal fitting which is tightened and fixed to the end face of the end portion of the continued beam member by using a bolt member of which top external thread portion is screwed to the bolt screw hole of the joint pipe; and a column connection pole-like metal fitting which is fixed as having a top end side portion protruded from the upper face and/or lower face of the end portion of the continued beam member as being inserted and mounted to the joint pipe through an opening end face of the joint pipe, wherein the lateral beam member is connected and fixed to the side face of the end portion of the continued beam member by using a drift pin while a connection groove formed at an end face of the lateral beam member is fitted to the side face connection metal fitting;

the extension beam member is connected and fixed to an end face of the end portion of the continued beam member by using a drift pin while a connection groove formed at an end face of the extension beam member is fitted to the end face connection metal fitting; and the column member is connected and fixed to the upper face and/or lower face of the end portion of the continued beam member by using a drift pin while a fitting hole formed at an end face of the column member is fitted to the top end side portion of the column connection pole-like metal fitting.

2. The beam-column connection structure of a continued beam connection portion according to claim 1, wherein the column connection pole-like metal fitting includes an overlapping bolt insertion hole at a part being inserted and mounted to the joint pipe as being arranged at a position coincident with the bolt insertion hole and bolt screw hole of the joint pipe; and the column connection pole-like metal fitting is fixed to the joint pipe by using the long bolt member and/or the bolt member which connect and fix the side face connection metal fitting and the end face connection metal fitting to the end portion of the continued beam member.

3. The beam-column connection structure of a continued beam connection portion according to claim 1, wherein the joint pipe is embedded in the pipe fitting hole in a state that the opening end face is arranged to be flush to the upper face and/or lower face of the end portion of the continued beam portion.

4. The beam-column connection structure of a continued beam connection portion according to claim 1, wherein the side face connection metal fitting and the end face connection metal fitting are plate-like connection metal fittings processed to have an approximately U-shaped section.

5. The beam-column connection structure of a continued beam connection portion according to claim 1, wherein the bolt insertion hole and the bolt screw hole are formed at a circumferential face of the joint pipe in a state of being mutually displaced in the axial direction of the joint pipe.

6. The beam-column connection structure of a continued beam connection portion according to claim 2, wherein the joint pipe is embedded in the pipe fitting hole in a state that the opening end face is arranged to be flush to the upper face and/or lower face of the end portion of the continued beam portion.

7. The beam-column connection structure of a continued beam connection portion according to claim 2, wherein the side face connection metal fitting and the end face connection metal fitting are plate-like connection metal fittings processed to have an approximately U-shaped section.

8. The beam-column connection structure of a continued beam connection portion according to claim 2, wherein the bolt insertion hole and the bolt screw hole are formed at a circumferential face of the joint pipe in a state of being mutually displaced in the axial direction of the joint pipe.

* * * * *